US010884658B2

(12) United States Patent
Benisty

(10) Patent No.: US 10,884,658 B2
(45) Date of Patent: Jan. 5, 2021

(54) COMPLETION ENTRY THROTTLING USING DATA STORAGE CONTROLLER

(71) Applicant: Western Digital Technologies, Inc., San Jose, CA (US)

(72) Inventor: Shay Benisty, Beer Sheva (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 121 days.

(21) Appl. No.: 15/893,430

(22) Filed: Feb. 9, 2018

(65) Prior Publication Data

US 2019/0250848 A1     Aug. 15, 2019

(51) Int. Cl.
*G06F 3/06* (2006.01)
*G06F 12/00* (2006.01)

(52) U.S. Cl.
CPC .............. *G06F 3/0659* (2013.01); *G06F 3/06* (2013.01); *G06F 3/0604* (2013.01); *G06F 3/0679* (2013.01); *G06F 12/00* (2013.01)

(58) Field of Classification Search
CPC .................................... G06F 3/06; G06F 12/00
See application file for complete search history.

(56) References Cited

U.S. PATENT DOCUMENTS

| | | | |
|---|---|---|---|
| 9,417,814 B1 * | 8/2016 | Hall | G06F 3/0653 |
| 9,690,714 B1 * | 6/2017 | Sites | G06F 12/1009 |
| 2007/0255892 A1 * | 11/2007 | Jachalsky | G11C 16/10 |
| | | | 711/103 |
| 2009/0196102 A1 * | 8/2009 | Kim | G11C 7/1045 |
| | | | 365/185.11 |
| 2013/0054871 A1 * | 2/2013 | Lassa | G06F 3/061 |
| | | | 711/103 |
| 2016/0342545 A1 * | 11/2016 | Arai | G06F 12/0868 |
| 2017/0123656 A1 | 5/2017 | Benisty et al. | |
| 2018/0227237 A1 * | 8/2018 | Buban | H04L 47/25 |
| 2018/0337867 A1 * | 11/2018 | Davies | H04L 47/26 |

OTHER PUBLICATIONS

NVM Express, Revision 1.0e, Jan. 23, 2013, 127 pages (Year: 2013).*
"NVM Express" Revision 1.3a; Oct. 24, 2017; 287 pages.

* cited by examiner

*Primary Examiner* — Charles Rones
*Assistant Examiner* — Tian-Pong Chang
(74) *Attorney, Agent, or Firm* — Loza & Loza, LLP; Gabriel Fitch

(57) ABSTRACT

The present disclosure, in various embodiments, describes technologies and techniques for use by a data storage controller or similar device for throttling the delivery of completion entries pertaining to the execution of commands by a nonvolatile memory (NVM) device, such as a NAND. In an illustrative example, the data storage controller selectively throttles the delivery of completion entries to a host processor using uniform delivery intervals to provide for the stable delivery of completion entries to the host. That is, in some examples, rather than immediately posting completion entries to a completion queue of the host using the same relative timing with which the completion entries are generated, the data storage controller selectively delays posting some completion entries relative to other completion entries, so the entries may be posted with uniform time delays. This may enable the host processor to more efficiently process the completion entries. NVMe examples are provided.

27 Claims, 12 Drawing Sheets

COMPLETION ENTRY THROTTLING USING DATA STORAGE CONTROLLER

FIELD

The subject matter described herein relates to data storage devices and controllers. More particularly, the subject matter relates, in some examples, to the delivery of completion entries using a data storage controller within a nonvolatile memory express (NVMe) system.

INTRODUCTION

The nonvolatile memory express (NVMe) system is a scalable host controller interface designed to address the needs of enterprise and client systems that utilize Peripheral Component Interconnect (PCI) Express-based solid state drives. See, for example, the NVM Express standard, Revision 1.3a, Oct. 24, 2017. With NVMe, a host device writes data storage device commands, such as read commands, write commands, and administrative commands, in submission queues that are implemented in host memory. The controller of a NVM storage device such as a NAND fetches the commands from the host submission queues, executes the commands, and posts entries in completion queues, which are also implemented in host memory, to thereby notify the host device of the completion of the commands. For example, completions may be generated by the NVM device controller upon determining that the data transfer for a specific command has been completed. For example, for a 16 kilobyte (KB) read command, the device controller may transfer NAND read data to the host, and when the device controller detects that the entire transfer has completed, a completion message is generated by the NVM device controller and posted to the host. The completion entries may include error messages to indicate if a command was unsuccessful. In this manner, NVMe exploits a paired submission and completion queue mechanism where commands are initially placed by host software into a submission queue and then the completions or error messages are placed by the NVM device controller into the associated completion queue. The completion queue may be, for example, a circular buffer with a 16 Byte fixed slot size used to post the status of completed commands as "completion entries."

In practice, completion entries may be generated by the NVM device controller at time intervals subject to considerable variation, resulting in relatively unstable performance by the NVM device controller. The timing of the interval variations may be due to factors such as variations in NAND die usage, the behavior of Read Look Ahead procedures, or other factors. Ordinarily, the NVM device controller forwards the completion entries to the host device using the same order and timing with which the completion entries are generated by the NVM device controller. The host device may thus receive the completion entries from the NVM device controller at more or less random times, which can be inconvenient for the host processor, particularly if the host processor needs to respond to an interrupt whenever a new completion entry is received. Moreover, with this arrangement, the host processor might need to respond to routine read or write command completion acknowledgements before receiving relatively more important error messages.

It would be desirable to provide systems and methods for delivering completion entries from a data storage device to a host device in a more intelligent and uniform manner.

SUMMARY

One embodiment of the present disclosure provides a method for use by a data storage controller, the method including: obtaining values indicative of completion of commands by a data storage device for reporting to a host device, the values obtained at non-uniform time intervals; storing the values in an internal queue within the data storage controller; and sending at least some of the values from the internal queue to the host device at time intervals that are more uniform than the non-uniform time intervals.

Another embodiment of the present disclosure provides a data storage controller, where the data storage controller includes a processing system configured to: obtain values indicative of completion of commands by a data storage device for reporting to a host device, the values obtained at non-uniform time intervals; store the values in an internal queue within the data storage controller; and send at least some of the values from the internal queue to the host device at time intervals that are more uniform than the non-uniform time intervals.

Yet another embodiment of the present disclosure provides an apparatus for use with a data storage controller, comprising: means for obtaining values indicative of completion of commands by a data storage device for reporting to a host device, the values obtained at non-uniform time intervals; means for storing the values in an internal queue within the data storage controller; and means for sending at least some of the values from the internal queue to the host device at time intervals that are more uniform than the non-uniform time intervals.

BRIEF DESCRIPTION OF THE DRAWINGS

The subject matter described herein will now be explained with reference to the accompanying drawings of which.

DETAILED DESCRIPTION

Figure 1:
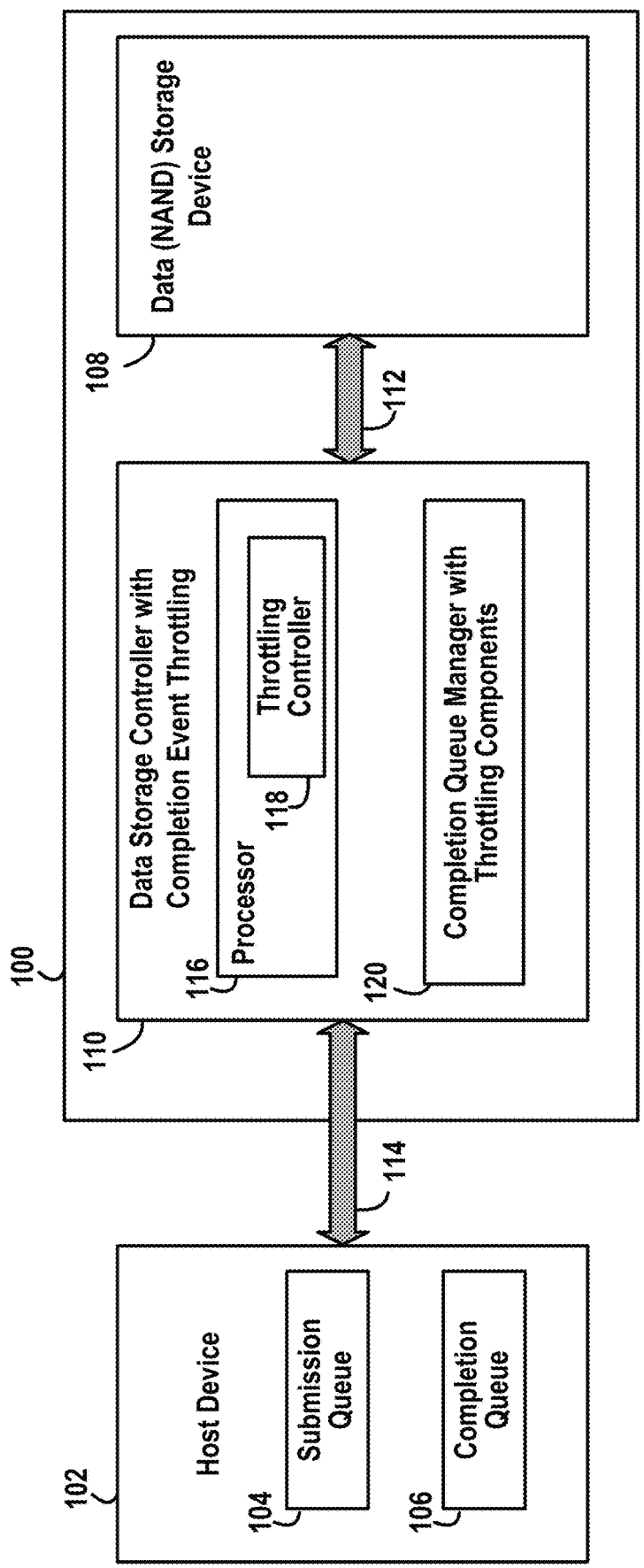
FIG. 1 illustrates a data storage system having a data storage controller and a data storage device (such as a NAND), where the data storage controller is equipped to selectively throttle the delivery of completion entry values to a host device.

In the following detailed description, reference is made to the accompanying drawings, which form a part thereof. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Overview

Aspects of the present disclosure provide various apparatus, devices, systems and methods for stabilizing the performance of a data storage device. Examples described herein relate to nonvolatile memory (NVM) storage systems configured for use with the nonvolatile memory express (NVMe) system. See, again, the NVM Express standard, Revision 1.3a, Oct. 24, 2017. However, aspects of the techniques described herein are applicable to other data storage systems or protocols. Briefly, in some examples, the data storage controller of an NVM device, such as a NAND, selectively and intelligently throttles the delivery of completion entries to a host processor to provide for the more uniform and stable delivery of the completion entries to the host processor. In some examples, rather than immediately forwarding completion entries to the host processor in the same order and using the same relative timing with which the completion entries are generated by the data storage controller, the data storage controller instead selectively delays the reporting of some completion entries relative to other completion entries so the entries may be delivered with uniform time delays. In this manner, the aforementioned instabilities in delivery performance of a data storage device may be smoothed out or eliminated to provide more stable performance.

Throttling may enable the host processor to more efficiently process the completion entries. In this regard, rather than requiring the host processor to respond (via an interrupt) to completion entries that might be posted at random times relative to one another, the host processor can instead respond to a sequence of completion entries that are uniformly spaced in time, i.e. the completion entries have uniform time delays between one entry and the next, such as one entry delivered to the host processor every five microseconds. In this manner, the host can better predict and respond to the behavior of the data controller, improving efficiency. Moreover, although the delivery times of some completion entries are delayed relative to others, the overall completion rate is not necessarily reduced and, indeed, may be improved since the host can more reliably predict and respond to the delivery of completion entries. For example, without the uniform and predictable delivery of completion entries using throttling, the host may sometimes need to temporarily stop the data storage device from delivering data, thus hindering the overall completion rate. (Generally speaking, performance is measured by command completion rate. The higher command completion rate, the better the performance.)

Still further, in some examples, high priority completion entries, such as those pertaining to error messages, are forwarded promptly to the host processor (i.e. without any imposed throttling delay) so that the host processor may be quickly notified. In some specific examples described herein, the data storage controller distinguishes between "simplified" completion entries, which are normal read/write command entries, and "full" completion entries, which may include error messages or the like. The simplified completion entries, which are by far the most common completion entries in a typical NVMe system, are throttled to provide for stable and uniform time delivery. The full completion entries, which are typically far less common, are not throttled and are instead reported promptly to the host processor.

Thus, the data storage controller may be programmed to hold simplified completion entries internally rather than posting them immediately to the host, whereas the full completion entries are posted immediately. The full completion entries hold more data and hence consume more internal memory than the simplified entries. By immediately posting the full completion entries, internal memory (area) resources of the data storage controller are not unduly burdened. The simplified completion entries do not hold much information since most fields are cleared, and hence do not consume much internal memory. Moreover, there may be no significant advantage to throttling full entries since the processing of full entries is considered a non-performance path. In any case, the hardware (HW) of the data storage controller may auto-generate the completion messages. The messages corresponding to simplified completion entries may be aggregated internally while posting them to the host at a configurable throttling rate, whereas the full entries are posted without any imposed delays. During an initialization or setup phase, the firmware (FW) of the data storage controller may enable the throttling feature and, if so, the completion rate (i.e. the throttling rate) may be configured as well.

FIG. 1 illustrates, at a high level, a data storage system 100 configured to selectively throttle the posting of completion entries to a host device 102 equipped with a submission queue 104 and a completion queue 106. For a write operation, the data storage system 100 receives data from the host device 102 (via the submission queue 104) and stores the data in a data storage device 108, such as a NAND, under the control of a data storage controller 110 (which may also referred to as a memory controller). Data and commands may be routed between the data storage controller 110 and the data storage device 108 along an internal bus 112. Data and commands may be routed between the host device 102 and the data storage controller 110 along an external bus 114. The data storage device 108 supplies information to the data storage controller 110 indicating successful completion of the storage of the data or indicating error or anomaly conditions. The data storage controller 110 generates completion entries to indicate successful completion of a particular data transfer command or to indicate errors or anomalies. That is, completion entries are generated by data storage controller 110 upon determining that the data transfer for a specific command has been completed. By way of example, for a particular read command, the data storage controller 110 may transfer read data to the host 102 and when the device controller 110 detects that the entire transfer has completed, a completion entry is generated by the device controller 110 and posted to the host via the completion queue 106.

In the implementation example of FIG. 1, data storage controller 110 includes a processor 116 with a throttling controller 118. The data storage controller 110 also includes a completion queue manager 120 that manages the posting of the completion entries to the completion queue 106 of the host device while selectively throttling delivery of the completion entries to the completion queue 106 in a stable and uniform manner. That is, completion queue manager 120, under the control of the throttling controller 118, intelligently throttles the delivery of completion entries to the completion queue 106 of the host device 102 to provide for the more uniform and stable delivery of the completion entries.

The throttling controller 118 may initially set the throttling rate of the completion queue manager 120 based on the link speed of the system (i.e. based on the transfer rate of bus 114) or other factors. The throttling rate relates to the time interval between the posting of consecutive simplified completion entries to the completion queue of the host. In some examples, the throttling rate is set to post one new simplified completion entry to the completion queue every 5 microseconds. That is, the throttling rate is "1 simplified completion entry per 5 microseconds." In another example, the throttling rate might be "1 simplified completion entry per 4 microseconds." And so when the throttling rate is higher, the interval between completion entries is reduced and more completion entries are posted per second (which tends to reduce the average number of entries in the completion queue). When the throttling rate is lower, the interval between entries is increased and fewer completion entries are posted per second (which tends to increase the average number of entries in the completion queue). The foregoing throttling rate numeric examples are just some illustrative examples and the throttling rate for any particular practical system may be based set on the particular needs of the system, such as the link speed and the page size (and/or link width). The throttling controller 118 may also selectively change the throttling rate to, for example, prevent the completion queue 106 from becoming too full (based on a programmable threshold value).

In examples where the system is configured to distinguish between full and simplified completion entries, the processor 116 controls the posting of the completion entries so that any full completion entries are posted to the completion queue 106 of the host device 102 without any throttling delay, whereas the simplified completion entries are routed to the completion queue 106 using the completion queue manager 120 for uniform delivery in accordance with the current throttling rate.

Note that FIG. 1 illustrates only selected features of an exemplary system. A more complete system configured in accordance with NVMe is described below. Moreover, the discussion of FIG. 1 has used the storage of data to the data storage device 108 (i.e. a write operation) as an illustrative example. The system is also equipped to retrieve data (i.e. perform read operations) from the data storage device 108 and to perform other related functions. A wide variety of completion entries may thus be generated and processed by the system.

Figure 2:
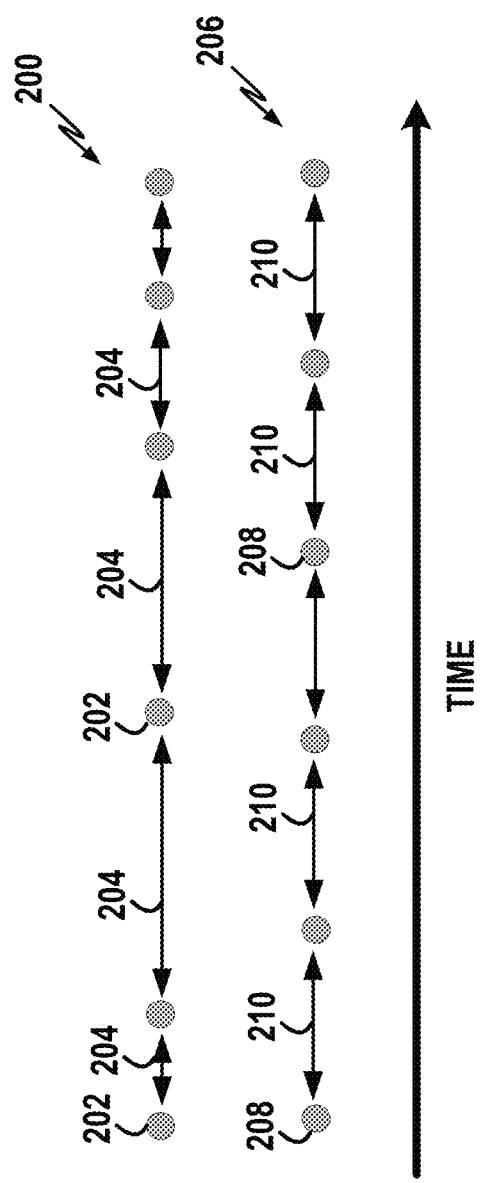
FIG. 2 graphically illustrates the selective throttling of the delivery of completion entry values to a host device by a data storage controller.

FIG. 2 illustrates the effect of the throttling of exemplary completion entries. A first graph 200 illustrates the relatively non-uniform (e.g. random) posting of individual completion entries 202, which are posted subject to varying time delays 204 therebetween. A second graph 206 illustrates the more uniform (e.g. fixed) posting of individual completion entries 208, which are posted subject to a uniform (fixed) time delay 210 therebetween. Note that the average completion rate is the same in both cases. That is, selectively delaying delivery of some completion entries relative to others to achieve a fixed rate does not reduce the average completion rate. Indeed, as already discussed, by allowing the host processor to more reliably predict the delivery times of completion entries based on a fixed rate, the overall completion rate (i.e. overall performance) may be improved as compared to relatively instable delivery.

Figure 3:
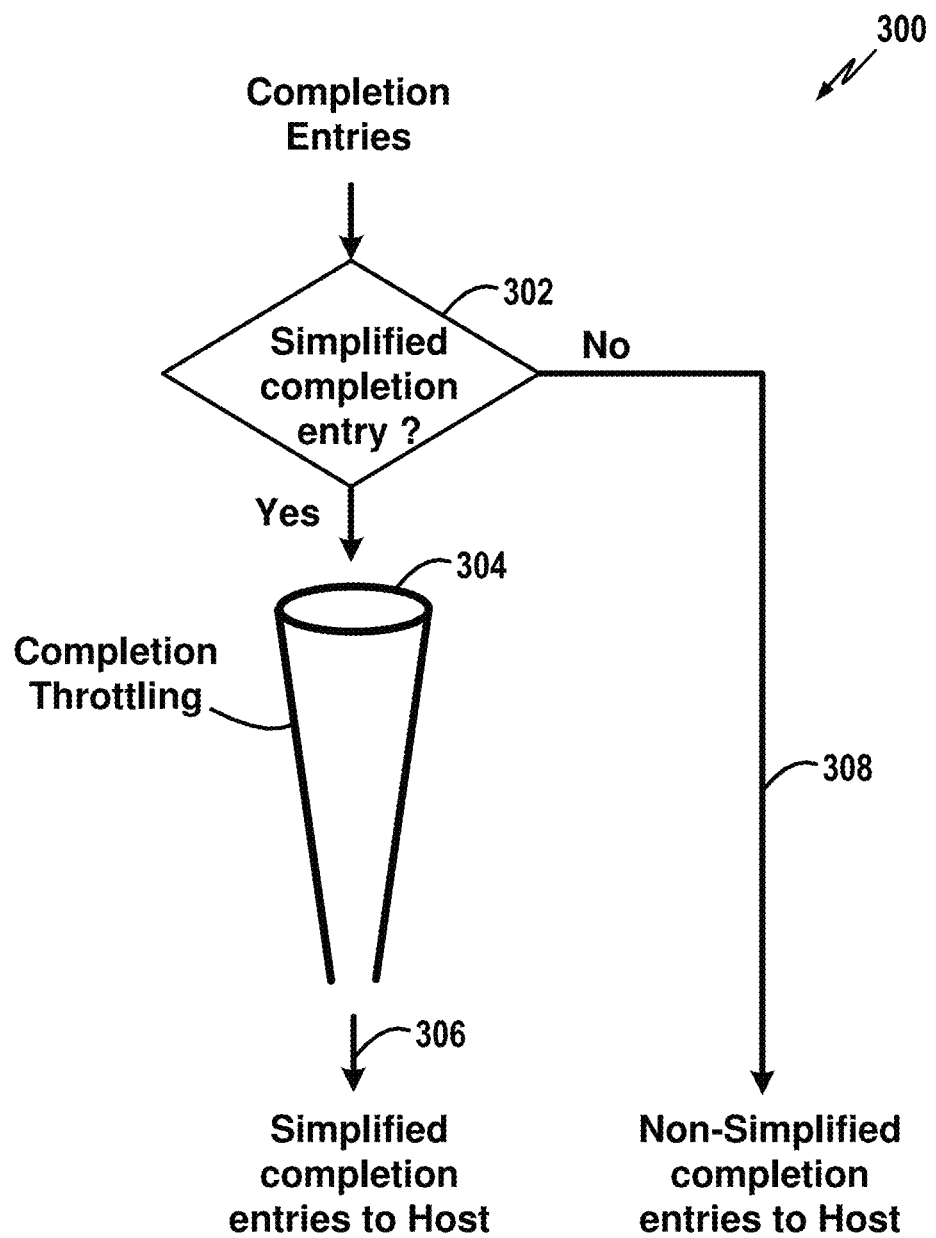
FIG. 3 is a high-level flow chart further illustrating the selective throttling of the delivery of completion entry values to a host device by a data storage controller.

FIG. 3 schematically summarizes the throttling of exemplary completion entries for an implementation 300 where simplified completion entries are throttled but full completion entries are not. Briefly, each new completion request is assessed at 302 to determine if it provides a simplified completion entry or a full completion entry. Simplified completion entries are throttled at 304 so that they can be posted at a uniform rate along line 306 to a host device (not shown in FIG. 3). The narrowing shape of throttle 304 is intended to illustrate the use of a uniform throttled posting rate (as with graph 206 of FIG. 2). In contrast, full completion entries are not throttled and are instead output along a line 308 to the host device to permit prompt processing by the host device of the full completion entries.

The features described herein may be used in conjunction with features described in U.S. patent application Ser. No. 14/929,317, filed Oct. 31, 2015, of Benisty et al., entitled "METHODS, SYSTEMS, AND COMPUTER READABLE MEDIA FOR AGGREGATING COMPLETION ENTRIES IN A NONVOLATILE STORAGE DEVICE," which is fully incorporated by reference herein. In one example, completion entries are aggregated as described in Ser. No. 14/929,317, but then posted to the host at a fixed (throttled) rate while each posting may hold one or more completion entries.

In the following section, various NVMe-based throttling examples are described.

Exemplary NVMe Embodiments

According to the NVMe standard, a host device communicates memory device commands, such as read commands, write commands, and administrative ("admin") commands, to a nonvolatile storage device using submission queues. The non-volatile storage device further executes the commands and subsequently places and/or posts corresponding entries in completion queues, which are also implemented in host memory, to notify the host device of completion of the commands. Notably, the transfer of completion entries on a PCIe bus existing between a host device and its associated nonvolatile memory device can be improved in NVMe systems by selectively throttling the posting of the completion entries.

Figure 4:
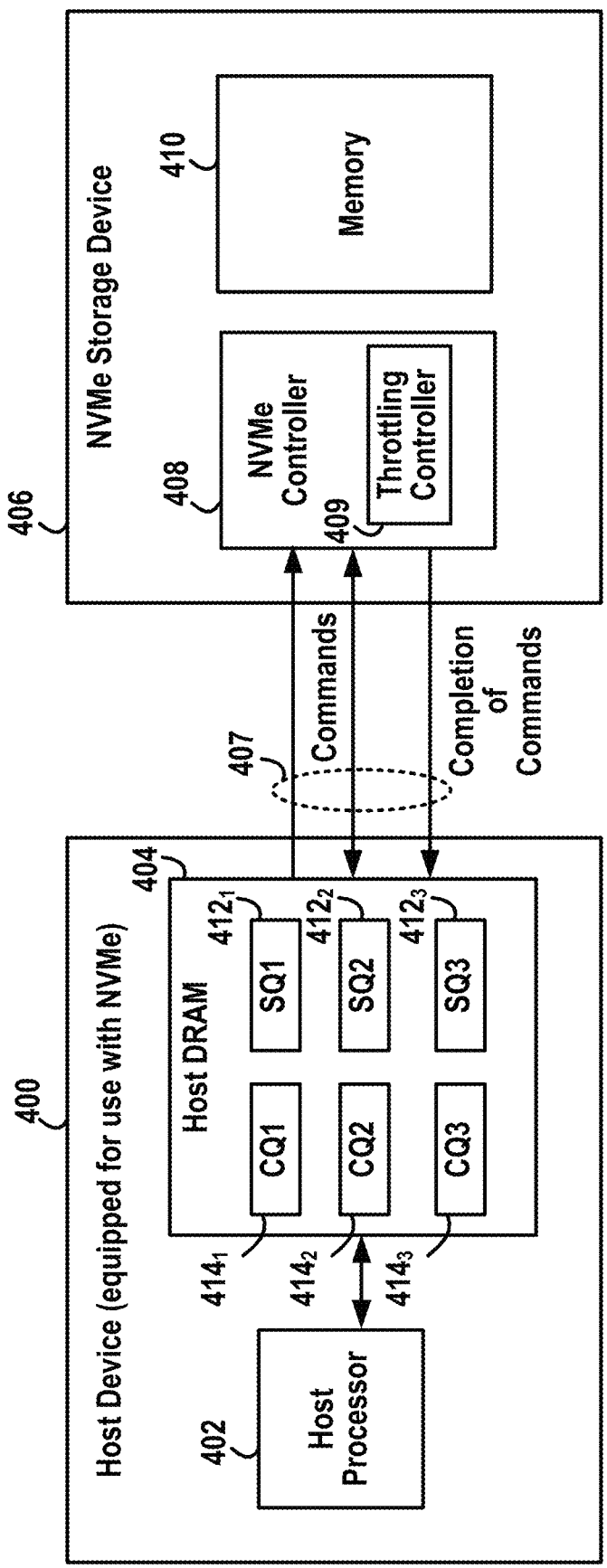
FIG. 4 illustrates a data storage system equipped for use with NVMe where the data storage controller selectively throttles the delivery of completion entry values to a host device.

FIG. 4 illustrates certain features of an exemplary NVMe architecture in which the completion throttling may be implemented. In FIG. 4, a host device 400 may be any suitable computing platform capable of accessing memory on a storage device using NVMe procedures. For example, host device 400 may be a desktop personal computer, a laptop computer, a tablet computer, a mobile telephone, or a front end to a storage array. The host device 400 includes a processor 402 and an internal memory 404, which in this example is dynamic random access memory (DRAM). The host device 400 may store data in an NVMe storage device 406. The NVMe device 406 may be any suitable device that provides nonvolatile memory storage for host device 400 in accordance with NVMe standards. For example, the NVMe device 406 may be a removable storage device, such as a solid state drive (SSD) that is removably connectable to host device 400. In another example, the NVMe device 406 may be non-removable or integrated within the host device 400. In some embodiments, the host device 400 and the NVMe device 406 are communicatively connected via a PCIe bus (represented via the set of arrows 407).

The NVMe storage device 406 of FIG. 4 includes an NVMe controller 408 and a nonvolatile memory 410. The NVMe controller 408 controls access to the nonvolatile memory 410 such as a NAND. The NVMe controller 408 thus may be a nonvolatile memory controller that implements or supports the NVMe protocol, and nonvolatile memory 410 may be 2D or 3D NAND flash memory. The NVMe controller includes a throttling controller 409, which controls the throttling of completion entries, as already discussed. For the host device 400 to read data from or write data to the NVMe storage device 406, the host processor 402 creates and writes commands in submission queues SQ1 $412_1$, SQ2 $412_2$, and SQ3 $412_3$. Three submission queues are shown for illustrative purposes. There may be more or fewer than three submission queues at any given time depending on NVMe device usage by the host system. The NVMe controller 408 fetches the commands from the submission queues $412_1$, $412_2$, and $412_3$ and executes the commands. Upon completion of the commands, the NVMe controller 408 writes completion entries that are ultimately directed to completion queues CQ1 $414_1$, CQ2 $414_2$, and CQ3 $414_3$ and throttles the delivery of those completion entries.

In some examples, each of the completion queues $414_1$, $414_2$, and $414_3$ is a circular buffer memory with a fixed 16 byte slot size that is configured to post completion entries (e.g., entries that indicate status of completed commands). In some embodiments, during an initialization phase, the host device 400 may create the set of submission queues (e.g., the queues $412_1$, $412_2$, and $412_3$) and the corresponding set of completion queues (e.g., the queues $414_1$, $414_2$, and $414_3$). The host device 400 may further generate and hold a sequential queue-completion queue mapping table (not shown) that records the associations/mappings via the use of sequential queue identifiers and completion queue identifiers.

Figure 5:
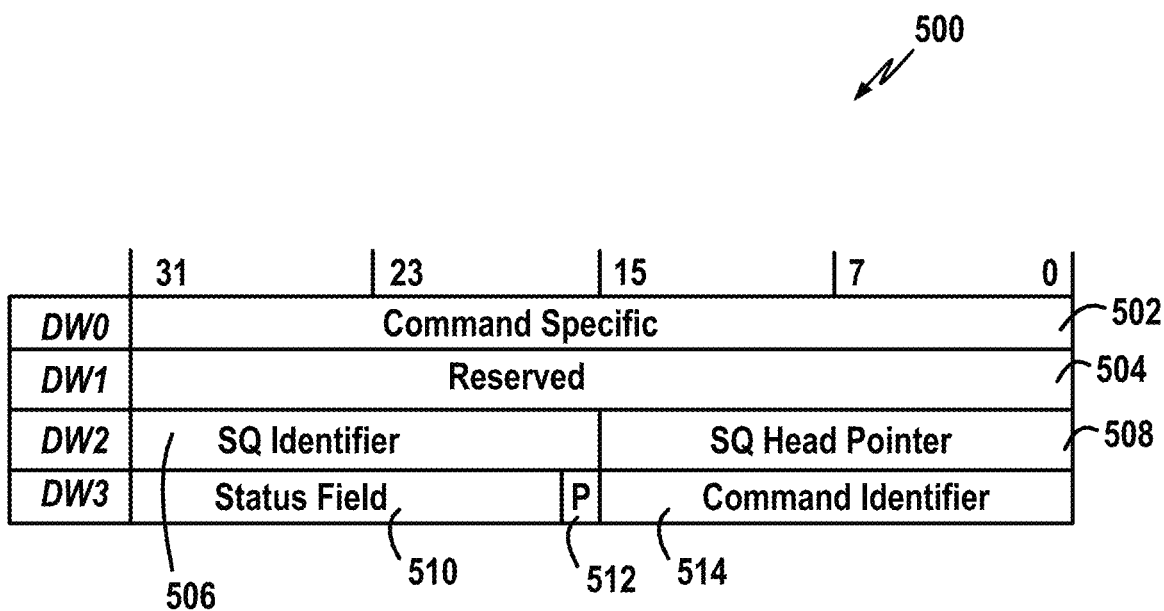
FIG. 5 illustrates an exemplary NVMe completion entry for processing by the NVMe system of FIG. 4

FIG. 5 illustrates an exemplary structure of a completion entry 500 for a particular command issued to the NVMe storage device of FIG. 4. The completion entry 500 contains data for writing (or posting) a completed command to a designated completion queue (CQ) on the host device (such as one of the completion queues of FIG. 4). As shown in FIG. 5, completion entry 500 includes a set of data fields including a command specific field 502, a reserved field 504, a submission queue (SQ) identifier field 506, a SQ head pointer field 508, a status field 510, a 'P' field 512, and a command identifier field 514. The fields are configured to contain data values based on the type of command associated with completion entry 500. For example, for simplified non-admin commands, a command specific field 502 and a Status field 510 of completion entry 500 are cleared to a zero value (unless an error occurs). For example, command specific field 502 contains zeroes if the associated command is an operational I/O command, such as a read command or a write command. In contrast, if the command is an admin command (or an error), command specific field 502 contains non-zero information in accordance with the admin command (or additional information indicative of the error) and hence is regarded as a full entry.

Using the completion entry structure of FIG. 5, a data storage controller may thus easily distinguish between simplified entries and full entries. Simplified entries are entries in which the Command Specific field 502, the Reserved field 504 and the Status field 510 are all cleared (i.e. all set to zero values). Full entries are entries in which the Command Specific field 502, the Reserved field 504 and/or the Status Field 510 are not equal to 0. That is, the Command Specific field 502, the Reserved field 504 and the Status Field 510 are cleared for successful read/write command completions. For other commands and error scenarios, the Command Specific field 502, the Reserved field 504 and the Status Field 510 are not cleared.

Figure 6:
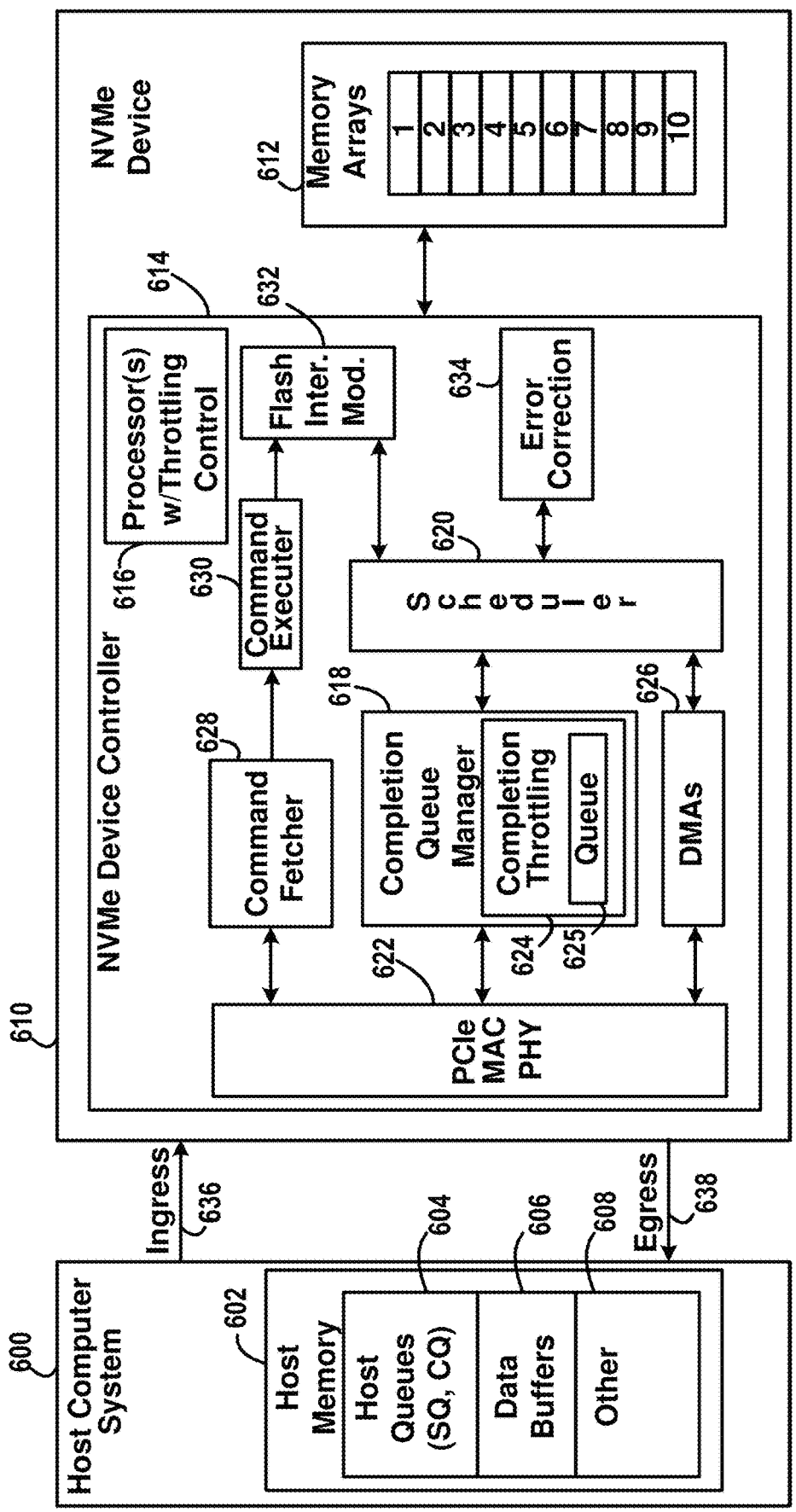
FIG. 6 further illustrates the exemplary NVMe data storage system of FIG. 4.

FIG. 6 illustrates further details of an exemplary NVMe system. In FIG. 6, a host computer system 600 includes host memory 602, which includes host queues 604 (such as the aforementioned SQ and CQ queues), data buffers 606, and other memory components 608. An NVMe device 610 includes memory arrays 612 and an NVMe device controller 614. The NVMe controller 614 includes one or more processors 616, one of which may be equipped to control throttling by, e.g., setting an initial throttling rate and then adjusting the rate, as appropriate. The processors are also responsible for the execution of Frond-End and Back-End tasks. A completion queue manager 618 is responsible for managing the host completion queues. Among other functions, the completion queue manager 618 routes completion entries received from a scheduler 620 to a completion queue within the host device 600 via a PCIe MAC PHY interface 622 while throttling the delivery of the completion entries using a completion throttling component 624, which includes an internal queue 625. Note that the internal queue is not necessarily a first in/first out (FIFO) queue since entries might not be pulled from the queue in the same order in which they are pushed initially into the queue.

In an illustrative example, simplified completion entries are pushed into the internal queue 625 by the completion queue manager 618 in the order received from the scheduler 620. The completion throttling component 624 then pulls completion entries from the internal queue to post the entries to a completion queues 604 of the host 600 in accordance with the current throttling rate. (At each posting, one or more messages may be posted to the host.) In some examples, if the number of entries in the internal queue 625 exceeds a programmable threshold value (which may be set of, for example, in the range of 3-10 and, in one particular example, is set to 5), the processor 616 increases the throttling rate (to thereby reduce the interval between completion postings). In some examples, the threshold is representative of an average number of entries (assessed over a time interval such as the average number of entries in the internal queue 625 over the last N microseconds where N might be 100 or other suitable value), and the throttling rate is changed only if the average exceeds the threshold. In other examples, the threshold is representative of the current number of entries, and so the throttling rate is changed whenever the current number of entries is found to exceed the threshold. As can be appreciated, other schemes may be used to adaptively adjust the throttling rate.

Actual pages of data to be delivered to the host device (such as the result of read commands) are delivered using one or more DMAs 626. Additional components of the NVMe controller 614 shown in FIG. 6 include a command fetcher 628, which is responsible for fetching and parsing the commands from the host and queuing them internally, a command executer 630, which is responsible for the arbitrating and executing the commands, a flash interface module 632, which is responsible for controlling and accessing the memory arrays, and an error correction module 634, which is responsible for error correction. Ingress and egress from the NVMe device 610 is illustrated via arrows 636 and 638.

Note that, in an exemplary implementation, the only components that are modified relative to conventional NVMe are the completion queue manager 618, which controls the throttling based on the current throttling rate, and the processor(s) 616, which set and adjust the throttling rate. The throttling described herein is otherwise transparent to all other components of the NVMe device 610, as well as the host device 600. That is, only minimal changes are made to otherwise standard NVMe systems to implement the throttling.

Figure 7:
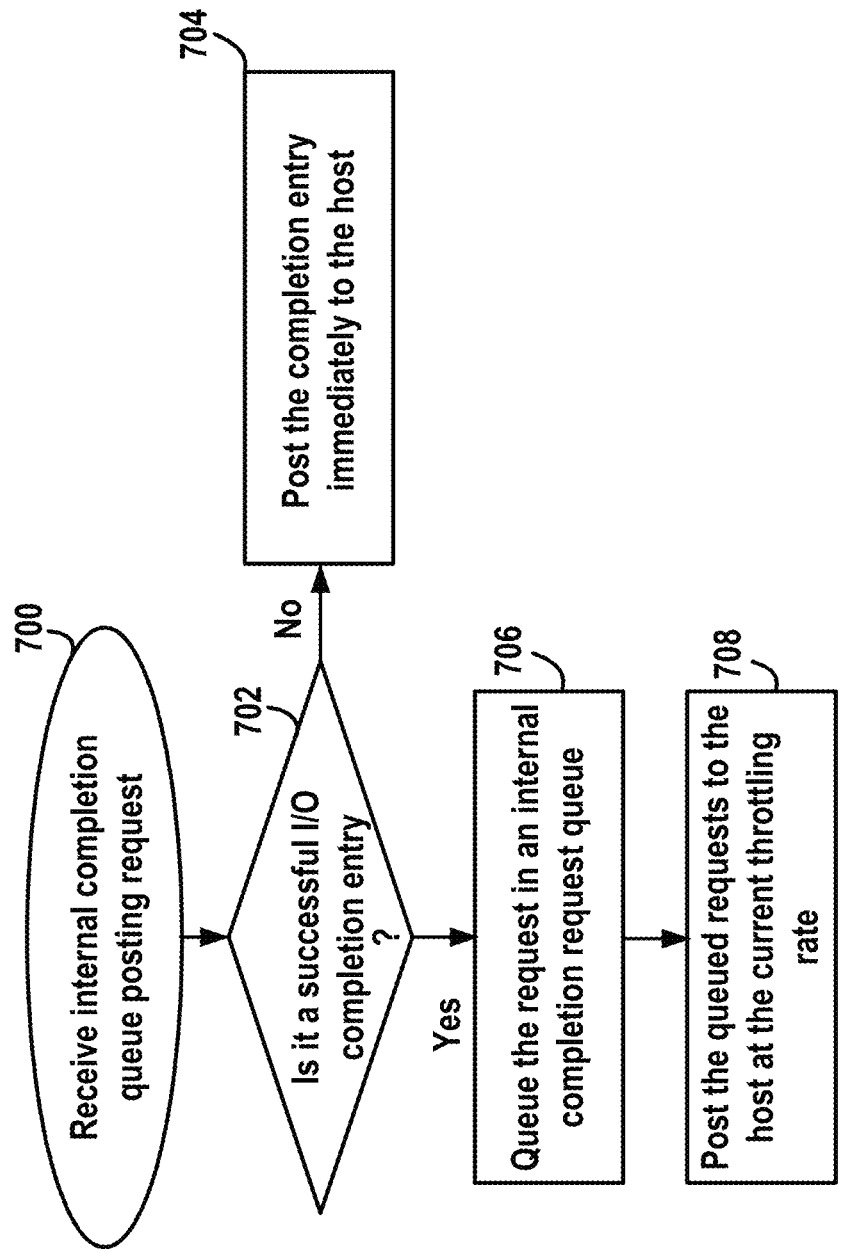
FIG. 7 is a flow chart illustrating selected features of the NVMe throttling procedure performed by the data storage controller of FIG. 6.

FIG. 7 is a flow diagram summarizing selected operational features of the NVMe system of FIG. 6. Briefly, at 700, an internal completion queue posting request is received and, if it is representative of a successful I/O completion entry (i.e. it is a simplified completion entry), as determined at 702, the completion entry is stored or queued within an internal completion request internal queue at 706 within the completion queue manager (such as internal queue 625 of FIG. 6). Otherwise, at 704, the completion entry is posted immediately (or as soon as feasible) to the host device. That is, the completion entry is posted substantially immediately if the entry is a full entry representative of an error condition or other full entry condition. Completion entries queued within the internal queue of 706 are posted to the host at the current throttling rate, at 708, using uniform time-delays between consecutive posts, as already explained.

Figure 8:
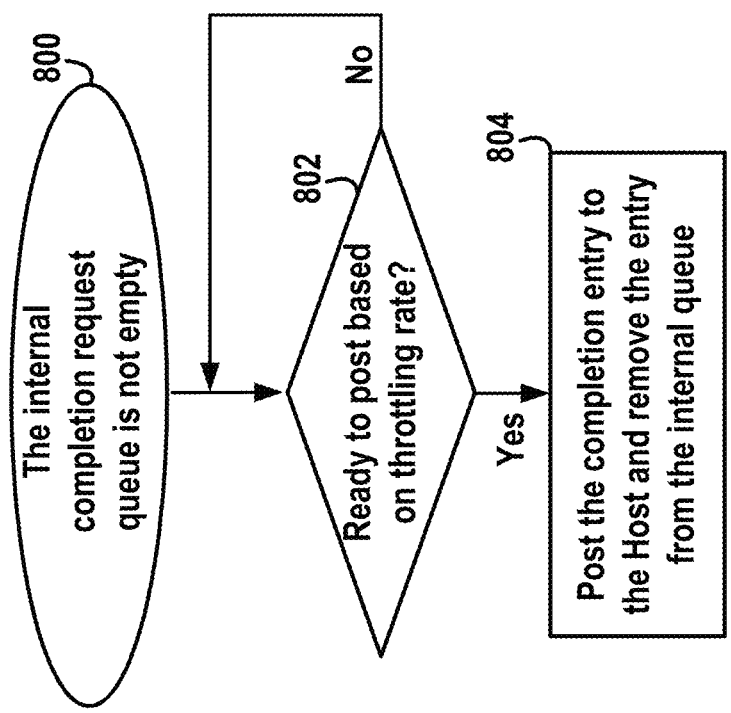
FIG. 8 is a flow chart further illustrating selected features of the NVMe throttling procedure performed by the data storage controller of FIG. 6.

FIG. 8 is another flow diagram summarizing selected operational features of the NVMe system of FIG. 6. Briefly, at 800, the illustrated operations begin with the internal completion request queue not empty (i.e. at least some entries have already been queued in the internal queue). If the completion queue manager is ready to post the next entry based on the current throttling rate, as determined at 802, the completion queue manager posts the next entry within the internal queue to the host, at 804, and removes that entry form the internal queue.

Figure 9:
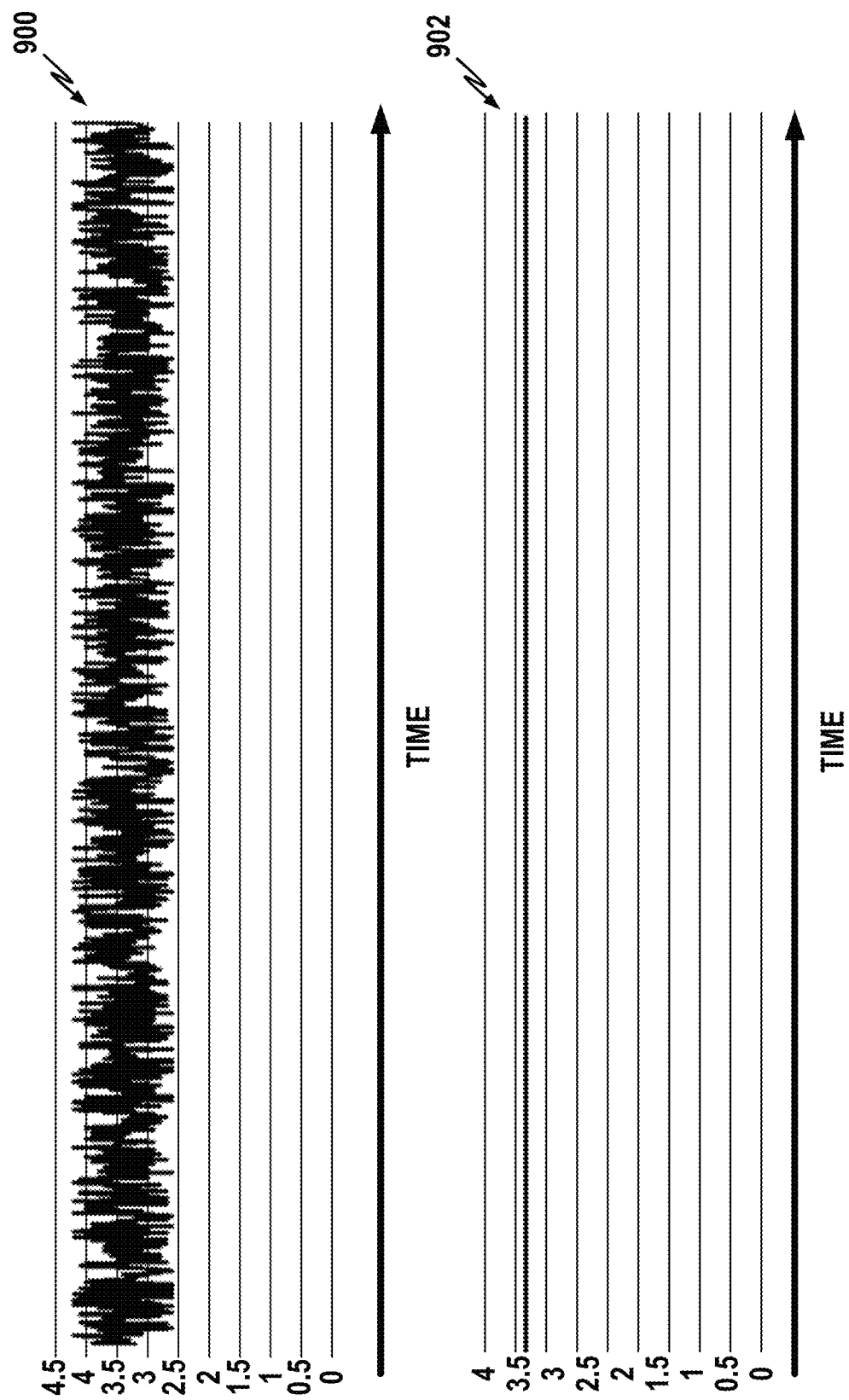
FIG. 9 graphically illustrates the stability and uniformity of the delivery of completion entry values that may be achieved with NVMe using completion entry throttling.

FIG. 9 illustrates the stabilization that maybe achieved by using the throttling techniques described herein. A graph 900 illustrates the rate of delivery of completion entries to a host device as a function of time (over a certain time interval) without throttling, with the vertical axis illustrating the delivery rate in gigabits (Gb). A graph 902 illustrates the rate of delivery of completion entries to the same host device as a function of time (over the same time interval) with throttling. As can be seen, without throttling, the rate of graph 900 is highly non-uniform (i.e. non-stable). With throttling, the rate of graph 902 is quite uniform and stable.

Further Exemplary Embodiments

Figure 10:
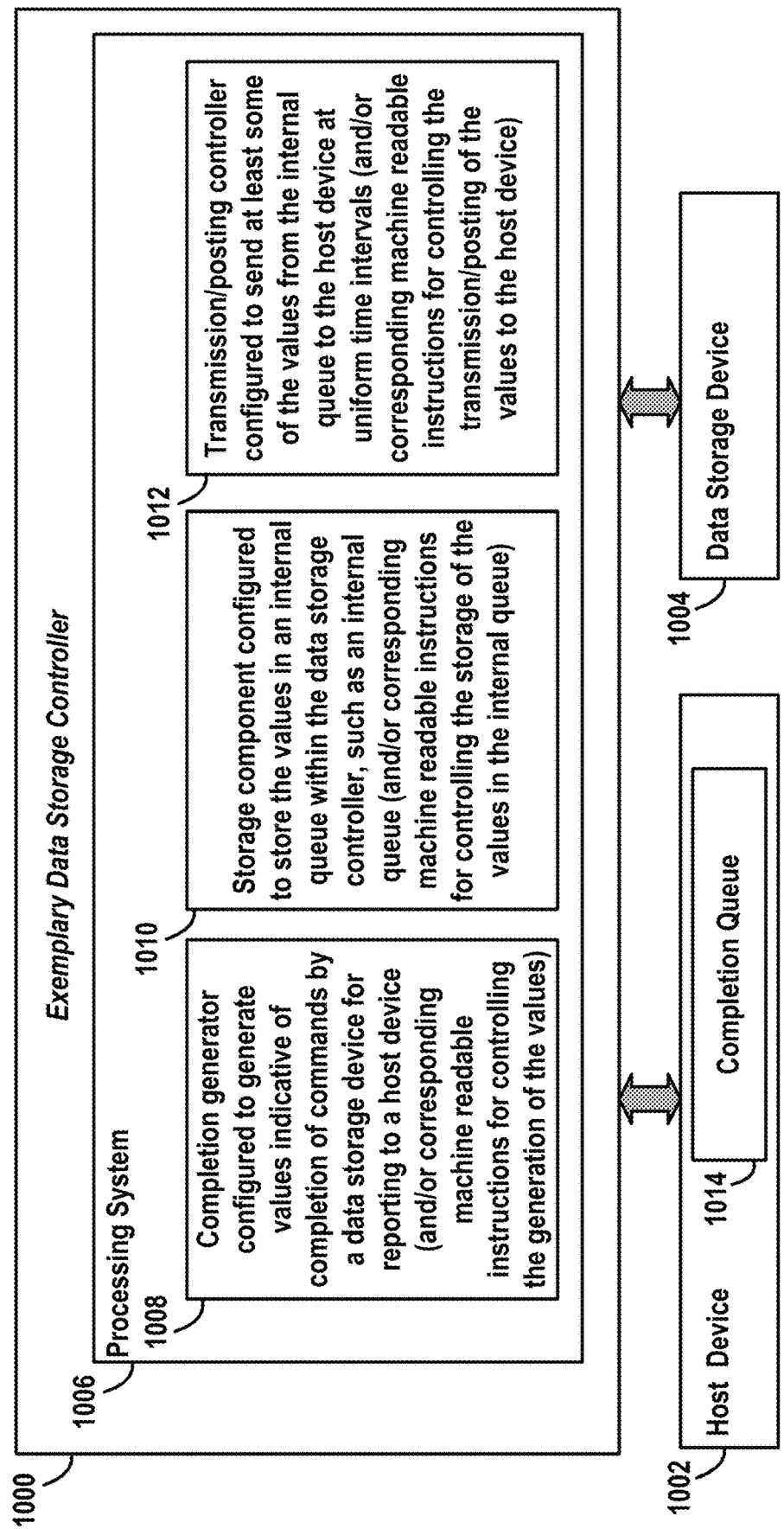
FIG. 10 is a block diagram summarizing selected features of a data storage controller equipped to throttle the delivery of completion entry values to a host device.
Figure 11:
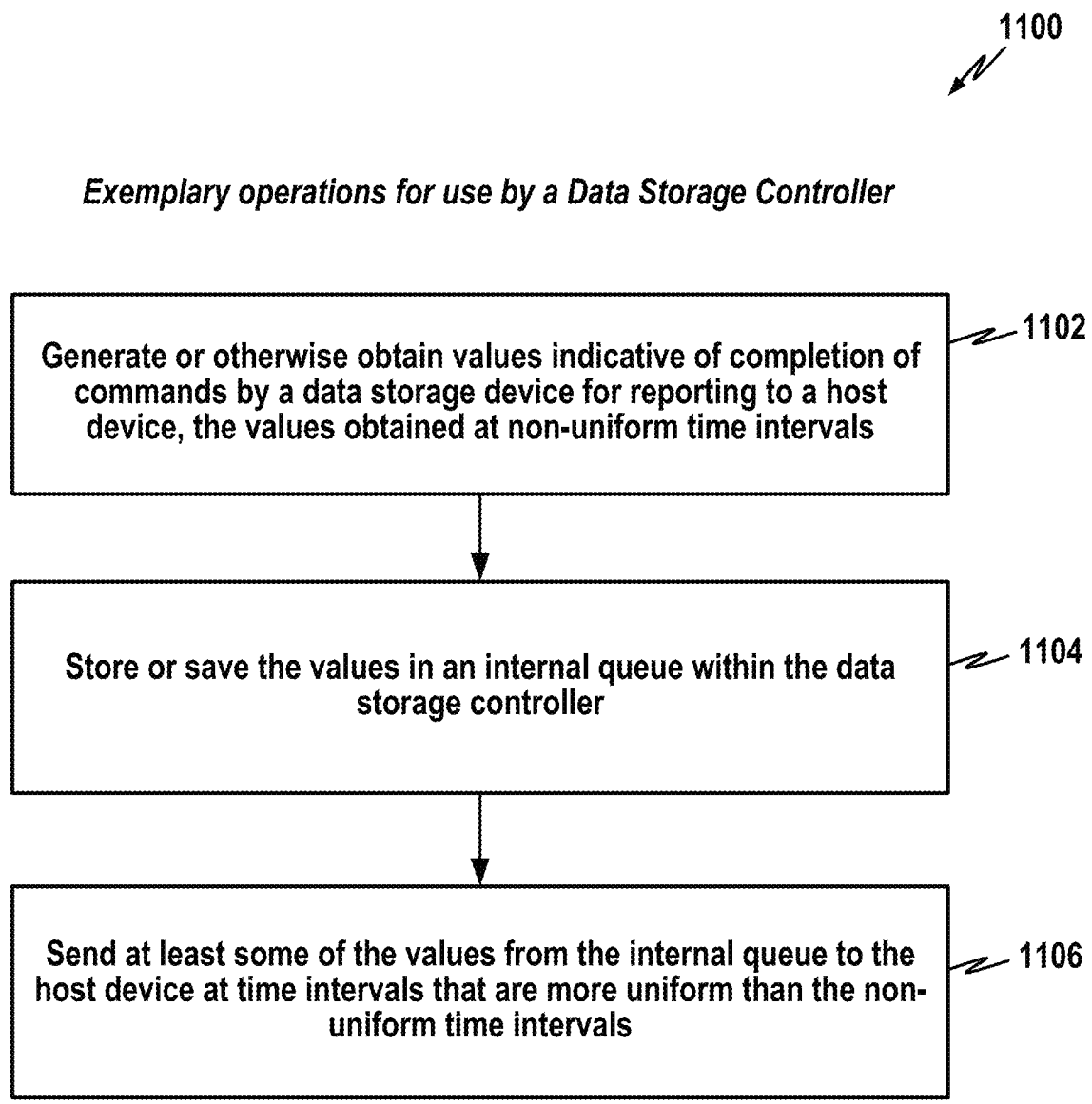
FIG. 11 is a high-level flow chart summarizing selected operations of a data storage controller equipped to throttle the delivery of completion entry values to a host device.
Figure 12:
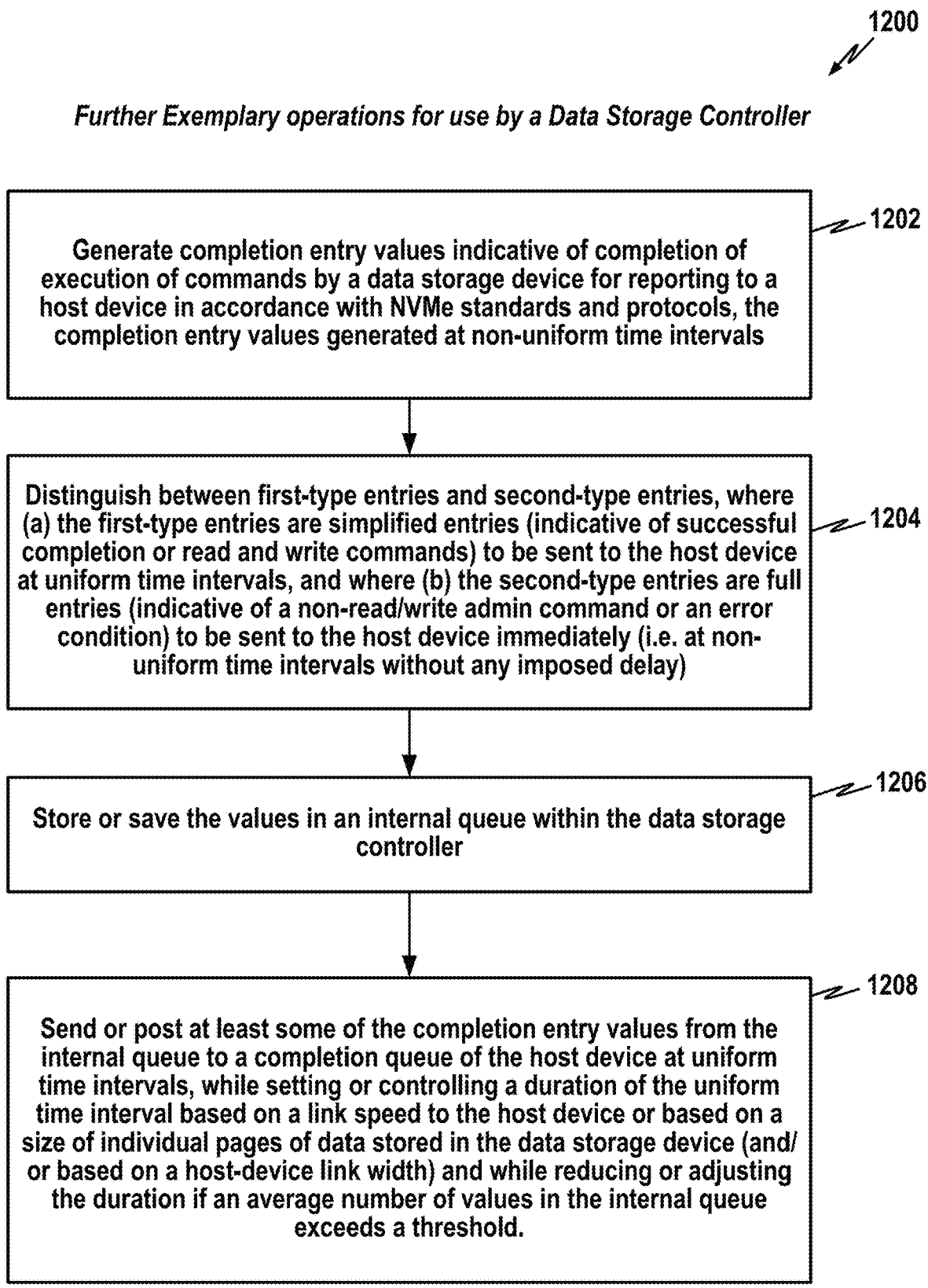
FIG. 12 is a flow chart summarizing further selected operations of a data storage controller equipped to throttle the delivery of completion entry values to a host device.

FIGS. 10-12 illustrate and summarize various general features of exemplary data storage controllers and methods, or procedures for use with data storage controllers.

FIG. 10 shows an exemplary data storage controller 1000 (or memory controller) configured to communicate with a host device 1002 and a data storage device 1004. Although many examples described herein relate to NVMe controllers for storing data within NAND devices, the data storage device 1004 may be any suitable memory or storage device and is not limited to NANDs, and the data storage controller 1000 may be any suitable memory controller device and is not limited to NVMe-based controllers.

The exemplary data storage controller 1000 of FIG. 10 includes a processor 1006 for controlling storage, retrieval and/or erasure of data within the memory device 1004 and for controlling the posting or delivery of completion entry values or the like to the host device 1002. The exemplary processor 1006 includes a completion generator component or controller 1008 configured to generate or otherwise obtain values indicative of completion of commands by the data storage device 1004 for reporting or posting to the host device 1002. The values may be generated at generally non-uniform time intervals by the completion generator 1008. The processor 1006 also includes a storage component or controller 1010 configured to store the values in an internal queue within the data storage controller (such as an internal queue). The processor 1006 further includes a transmission/posting controller 1012 configured to send, transmit or post at least some of the values from the internal queue to the host device 1002 at uniform time intervals (i.e. at time intervals that are relatively more uniform than the time intervals with which the processing system generates the values), using techniques described above or other suitable throttling techniques. In the example of FIG. 10, the values are posted to a completion queue 1014 of the host device but this is just one example of a component of the host device that can be equipped to receive the values.

In at least some examples, means may be provided for performing the functions illustrated in FIG. 10 and/or other functions illustrated or described herein. For example, an apparatus (e.g. processing system 1006) may be provided for use with a data storage device (e.g. storage device 1004) where the apparatus includes: means (such as completion generator 1008) for generating or otherwise obtaining values indicative of completion of commands by a data storage device for reporting to a host device, the values generated or obtained at non-uniform time intervals; means for storing the values (such as storage component 1010) in an internal queue within the data storage controller; and means for sending (such as transmission/posting controller 1012) at least some of the values from the internal queue to the host device at time intervals that are more uniform than the non-uniform time intervals.

The host device may include a completion queue (1014), and the means for sending values to the host device may include a means for posting values (such as completion queue manager 618 of FIG. 6) from the internal queue to the completion queue of the host device at uniform time intervals. The values may be completion entries with each entry indicating execution of a respective command by the data storage device. The completion entries may include first-type entries and second-type entries, wherein the first-type entries are sent to the host device at uniform time intervals, and wherein the second-type entries are sent to the host device at non-uniform time intervals. The first-type entries may be simplified entries indicative of successful completion of a read or write command by the data storage device. The second-type entries may be full entries indicative of a non-read/write command or an error condition. The second-type entries may be sent to the host device by the data storage controller without any imposed delay. The apparatus may further include means for controlling a duration of the uniform time interval (such as the throttling control processor 616 of FIG. 6). The means for controlling the duration of the uniform time interval may set the duration based on a link speed to the host device or on a size of individual pages of data stored in the data storage device (with the throttling rate being set higher for faster link speeds or for larger page sizes so as to reduce the interval between completion postings and thereby increase the rate at which completion entries are posted to the host). The means for controlling the duration of the uniform time intervals may reduce the duration if a number of values in the internal queue exceeds a threshold, as described above.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

In at least some examples, a machine-readable storage medium may be provided having one or more instructions which when executed by a processing circuit causes the processing circuit to performing the functions illustrated in FIG. 10 and/or other functions illustrated or described herein. For example, instructions may be provided for: generating or otherwise obtaining values indicative of completion of commands by a data storage device for reporting to a host device, the values generated or obtained at non-uniform time intervals; storing the values in an internal queue within the data storage controller; and for sending at least some of the values from the internal queue to the host device at time intervals that are more uniform than the non-uniform time intervals.

The host device may include a completion queue, and the instructions for sending values to the host device may include instructions for posting values from the internal queue to the completion queue of the host device at uniform time intervals. The values again may be completion entries with each entry indicating execution of a respective command by the data storage device. The instructions may further include instructions for controlling a duration of the uniform time interval. The instructions for controlling the duration of the uniform time interval may set the duration based on a link speed to the host device or on a size of individual pages of data stored in the data storage device. The instructions for controlling the duration of the uniform time intervals may reduce the duration if a number of values in the internal queue exceeds a threshold, as described above. These are just some examples of suitable instructions for performing or controlling the various functions or operations.

FIG. 11 broadly summarizes exemplary operations 1100 for use by or with a data storage controller or other suitable device to process completion values. At 1102, the data storage controller generates or otherwise obtains values (such as completion entry values) indicative of completion of commands by a data storage device for reporting to a host device, the values obtained at non-uniform time intervals. At 1104, the data storage controller stores or saves the values in an internal queue within the data storage controller. At 1106, the data storage controller sends (e.g. posts or transmits) at least some of the values from the internal queue to the host device at time intervals that are more uniform than the non-uniform time intervals (e.g. the values are posted to the host device at time intervals that are more uniform than the non-uniform time intervals with which the values are generated by the data storage controller). As already discussed, the values may be posted to a completion queue of the host device using NVMe standards at a throttled rate.

FIG. 12 further summarizes exemplary operations 1200 for use by or with a data storage controller or other suitable device to process completion values. At 1202, the data storage controller generates completion entry values indicative of completion of execution of commands by a data storage device for reporting to a host device in accordance with NVMe standards and protocols, the completion entry values generated at non-uniform time intervals. At 1204, the data storage controller distinguishes between first-type entries and second-type entries, where (a) the first-type entries are simplified entries (indicative of successful completion or read and write commands) to be sent to the host device at uniform time intervals, and where (b) the second-type entries are full entries (indicative of a non-read/write admin command or an error condition) to be sent to the host device immediately (i.e. at non-uniform time intervals without any imposed delay). At 1206, the data storage controller stores or otherwise saves the values in an internal queue within the data storage controller. At 1208, the data storage controller sends (e.g. posts) at least some of the completion entry values from the internal queue to a completion queue of the host device at uniform time intervals, while setting or controlling a duration of the uniform time interval based on a link speed to the host device or based on a size of individual pages of data stored in the data storage device (and/or based on a host-device link width, which may be relate to page size) and while reducing or adjusting the duration if an average number of values (or some other measure of the number of values) in the internal queue exceeds a threshold.

By way of example, insofar as link speed is concerned, PCIe provides various "Gen" configurations with differing link speeds, e.g. GEN1 (2.5 gigatransfers/second (GT/s)), GEN2 (5.0 GT/s), GEN3 (8.0 GT/s), and GEN4 (16.0 GT/s). In some examples of block 1208 of FIG. 12, the faster the GEN link speed, the shorter the uniform time intervals between the postings to the host of the completion entries. For instance, for a GEN4 (16.0 GT/s) implementation, the uniform interval may be set to a duration only half as long as the duration used with a GEN3 (8.0 GT/s) implementation. That is, the configuration of the throttling mechanism may be dynamically changed in block 1208 to alter the duration of the uniform time intervals based on GEN link speed. Insofar as link width is concerned, different PCIe implementations may use a different number of host-device interface lanes (e.g., ×1, ×4, ×8, or ×12). In some examples of block 1208, the more lanes, the shorter the uniform time interval used by the system. For instance, for an implementation with eight lanes (×8), the uniform interval may be set to a duration only half as long as the duration used with a four lane (×4) implementation. That is, the configuration of the throttling mechanism may be dynamically changed during block 1208 to alter the duration of the uniform time intervals based on the number of PCIe lanes.

The subject matter described herein can be implemented in any suitable NAND flash memory, including 2D or 3D NAND flash memory. Semiconductor memory devices include volatile memory devices, such as DRAM) or static random access memory ("SRAM") devices, nonvolatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured. The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon. The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements. One of skill in the art will recognize that the subject matter described herein is not limited to the two dimensional and three dimensional exemplary structures described but cover all relevant memory structures within the spirit and scope of the subject matter as described herein and as understood by one of skill in the art.

While the above descriptions contain many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents. Moreover, reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

Various details of the presently disclosed subject matter may be changed without departing from the scope of the presently disclosed subject matter. Furthermore, the foregoing description is for the purpose of illustration only, and not for the purpose of limitation.

What is claimed is:

1. A method for use by a data storage controller coupled to a non-volatile memory (NVM) having a set of memory arrays that store data in pages with individual page sizes, the method comprising:
   obtaining completion entries indicative of completion of commands by the arrays of the NVM for reporting to a host device, the completion entries obtained at non-uniform time intervals;
   storing the completion entries in an internal queue within the data storage controller; and
   sending at least some of the completion entries from the internal queue to the host device at output time intervals that are more uniform than the non-uniform time intervals while controlling a duration of the output time intervals based on sizes of individual pages in the arrays of the NVM, including using a first output interval duration with an array having a first individual page size and using a second output interval duration with an array having a second individual page size, wherein the first output interval duration differs from the second output interval duration and the first individual page size differs from the second individual page size.

2. The method of claim 1, wherein the host device includes a completion queue, and wherein sending completion entries to the host device comprises sending completion entries from the internal queue to the completion queue of the host device at uniform time intervals for use with a particular page size.

3. The method of claim 2,
   wherein the completion entries include first-type entries and second-type entries,
   wherein the first-type entries are sent to the host device at the uniform time intervals, and
   wherein the second-type entries are sent to the host device at the non-uniform time intervals.

4. The method of claim 3, wherein the first-type entries are indicative of successful completion of a read or write command by the data storage device.

5. The method of claim 3, wherein the second-type entries are indicative of a non-read/write command or an error condition.

6. The method of claim 3, wherein the second-type entries are sent to the host device by the data storage controller without any imposed delay.

7. The method of claim 1, wherein the time intervals at which completion entries from the internal queue are sent to the host device for use with a particular page size are uniform time intervals, and wherein the method further comprises setting a duration of the uniform time intervals.

8. The method of claim 7, wherein setting the duration of the uniform time intervals includes setting the duration of the uniform time intervals based, at least in part, on a link speed to the host device.

9. The method of claim 1, wherein obtaining the completion entries indicative of completion of commands by the data storage device comprises generating the values based on information obtained from the NVM.

10. The method of claim 1, further comprising controlling the duration of the output time intervals based on a host-device link width.

11. The method of claim 1, wherein the data storage controller is coupled to the host device by a physical interconnection bus having a plurality of physical interconnection lanes, and wherein the method further comprises dynamically adjusting the duration of the output time intervals based on the number of lanes of the interconnection bus, including increasing the duration of the time intervals in response to a reduction in a number of lanes and decreasing the duration of the intervals in response to an increase in the number of lanes.

12. The method of claim 1, wherein a size of each completion entry is independent of the individual page sizes of the arrays of the NVM.

13. A data storage controller for use with a non-volatile memory (NVM) having a set of memory arrays configured to store data in pages with individual page sizes, comprising:
a processing system configured to
obtain completion entries indicative of completion of commands by the arrays of the NVM for reporting to a host device, the completion entries obtained at non-uniform time intervals;
store the completion entries in an internal queue within the data storage controller; and
send at least some of the completion entries from the internal queue to the host device using output time intervals that are more uniform than the non-uniform time intervals while controlling a duration of the output time intervals based on sizes of individual pages in the arrays of the NVM, including using a first output interval duration with an array having a first individual page size and using a second output interval duration with an array having a second individual page size, wherein the first output interval duration differs from the second output interval duration and the first individual page size differs from the second individual page size.

14. The data storage controller of claim 13, wherein the host device includes a completion queue, and wherein the processing system is further configured to send the completion entries to the host device by posting completion entries from the internal queue to the completion queue of the host device at uniform time intervals for use with a particular page size.

15. The data storage controller of claim 14,
wherein the completion entries include first-type entries and second-type entries,
wherein the processing system is further configured to post the first-type entries to the host device at the uniform time intervals, and
wherein the processing system is further configured to post the second-type entries to the host device at the non-uniform time intervals.

16. The data storage controller of claim 15, wherein the first-type entries are indicative of successful completion of a read or write command by the data storage device.

17. The data storage controller of claim 15, wherein the second-type entries are indicative of a non-read/write command or an error condition.

18. The data storage controller of claim 15, wherein the processing system is further configured to post the second-type entries to the host device by the data storage controller without any imposed delay.

19. The data storage controller of claim 13, wherein the time intervals at which completion entries from the internal queue are sent to the host device for use with a particular page size are uniform time intervals, and wherein the processing system is further configured to control a duration of the uniform time intervals.

20. The data storage controller of claim 19, wherein the processing system is further configured to control the duration of the uniform time intervals by setting the duration based, at least in part, on a link speed to the host device.

21. The data storage controller of claim 13, wherein the processing system is further configured to obtain the completion entries by generating the completion entries based on information obtained from the NVM device.

22. The data storage controller of claim 13, wherein the processing system is further configured to control the duration of the output time intervals based on a host-device link width.

23. The data storage controller of claim 13, wherein the data storage controller is coupled to the host device by a physical interconnection bus having a plurality of physical interconnection lanes, and wherein the method further comprises dynamically adjusting the duration of the output time intervals based on the number of lanes of the interconnection bus, including increasing the duration of the time intervals in response to a reduction in a number of lanes and decreasing the duration of the intervals in response to an increase in the number of lanes.

24. The data storage controller of claim 13, wherein a size of each completion entry is independent of the individual page sizes of the arrays of the NVM.

25. An apparatus coupled to a non-volatile memory (NVM) having a set of memory arrays that store data in pages with individual page sizes, comprising:
means for obtaining values at non-uniform time intervals indicative of completion of commands by the NVM for reporting to a host device;
means for temporarily storing the values;
means for sending at least some of the values to the host device at time intervals that are more uniform than the non-uniform time intervals; and
means for controlling a duration of the time intervals that are more uniform than the non-uniform time intervals based on sizes of individual pages in the arrays of the NVM, including using a first output interval duration with an array having a first individual page size and using a second output interval duration with an array having a second individual page size, wherein the first output interval duration differs from the second output interval duration and the first individual page size differs from the second individual page size.

26. The apparatus of claim 25, wherein the apparatus is coupled to the host device by a physical interconnection bus having a plurality of physical interconnection lanes, and wherein the apparatus further comprises means for dynamically adjusting the duration of the output time intervals based on the number of lanes of the interconnection bus, including means for increasing the duration of the time intervals in response to a reduction in a number of lanes and means for decreasing the duration of the intervals in response to an increase in the number of lanes.

27. The apparatus of claim 25, wherein a size of each completion entry is independent of the individual page sizes of the arrays of the NVM.

* * * * *